United States Patent
Yamamoto

(10) Patent No.: US 12,438,241 B2
(45) Date of Patent: Oct. 7, 2025

(54) BATTERY

(71) Applicant: TOYOTA JIDOSHA KABUSHIKI KAISHA, Toyota (JP)

(72) Inventor: Satomi Yamamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 491 days.

(21) Appl. No.: 18/054,607

(22) Filed: Nov. 11, 2022

(65) Prior Publication Data

US 2023/0163427 A1    May 25, 2023

(30) Foreign Application Priority Data

Nov. 22, 2021    (JP) ................. 2021-189320

(51) Int. Cl.
  *H01M 50/533*    (2021.01)
  *H01M 4/04*      (2006.01)
  *H01M 10/0525*   (2010.01)
  *H01M 50/536*    (2021.01)
  *H01M 50/538*    (2021.01)

(52) U.S. Cl.
  CPC ....... *H01M 50/533* (2021.01); *H01M 4/0404* (2013.01); *H01M 10/0525* (2013.01); *H01M 50/536* (2021.01); *H01M 50/538* (2021.01)

(58) Field of Classification Search
  CPC ............. H01M 50/533; H01M 50/538; H01M 50/536; H01M 4/0404
  See application file for complete search history.

(56) References Cited

FOREIGN PATENT DOCUMENTS

| JP | 2002170547 A | 6/2002 |
|----|--------------|--------|
| JP | 2009146867 A | 7/2009 |
| JP | 2013211172 A | 10/2013 |
| JP | 2019053917 A | 4/2019 |

*Primary Examiner* — Sarah A. Slifka
(74) *Attorney, Agent, or Firm* — Dickinson Wright, PLLC

(57) ABSTRACT

A main object of the present disclosure is to provide a battery with excellent bonding of tabs and current collecting terminals. The present disclosure achieves the object by providing a battery including a plurality of a power generating element, wherein: the power generating element includes a first active material layer, a second active material layer, an electrolyte layer arranged between the first active material layer and the second active material layer, a first current collector that collects currents of the first active material layer, and a second current collector that collects currents of the second active material layer; the first current collector includes a first tab including at least a root part; a plurality of the first tab is arranged to overlap with each other in a thickness direction of the power generating element; the battery includes a first current collecting terminal electronically connected to the plurality of the first tab; and in the plurality of the power generating element, a resin layer that reinforces the root part is arranged between the first tab neighboring.

9 Claims, 5 Drawing Sheets

BATTERY

TECHNICAL FIELD

The present disclosure relates to a battery.

BACKGROUND ART

A battery such as a lithium ion secondary battery usually comprises a power generating element including a cathode, an anode, and an electrolyte layer arranged between the cathode and the anode. Patent Literature 1 discloses a sealed-type battery in which a curved part is arranged in at least one of the cathode and the anode, and the curved part is brought into contact a current collecting plate in a surface.

CITATION LIST

Patent Literature

Patent Literature 1: Japanese Patent Application Laid-Open (JP-A) No. 2002-170547

SUMMARY OF DISCLOSURE

Technical Problem

The cathode usually includes a cathode active material layer and a cathode current collector. The anode usually includes an anode active material layer and an anode current collector. These current collectors include tabs for electronically connecting to current collecting terminals. In general, the thickness of the tab is thin, and thus unintended deformation easily occurs. When the deformation of the tab occurs, there is a case where the bonding of the tab and the current collecting terminal is insufficient.

The present disclosure has been made in view of the above circumstances and a main object thereof is to provide a battery with excellent bonding of tabs and current collecting terminals.

Solution to Problem

The present disclosure provides a battery including a plurality of a power generating element, wherein: the power generating element includes a first active material layer, a second active material layer, an electrolyte layer arranged between the first active material layer and the second active material layer, a first current collector that collects currents of the first active material layer, and a second current collector that collects currents of the second active material layer; the first current collector includes a first tab including at least a root part; a plurality of the first tab is arranged to overlap with each other in a thickness direction of the power generating element; the battery includes a first current collecting terminal electronically connected to the plurality of the first tab; and in the plurality of the power generating element, a resin layer that reinforces the root part is arranged between the first tab neighboring.

According to the present disclosure, the resin layer that reinforces the root part of the tab is arranged, and thus the battery with excellent bonding of tabs and current collecting terminals may be achieved.

In the disclosure, the first tab may include a curved part that is arranged in a tip of the root part, and extends to a direction crossing a direction to which the root part extends.

In the disclosure, an angle formed by the direction to which the curved part extends and the thickness direction of the power generating element may be 0° or more and 30° or less.

In the disclosure, when $H_T$ designates a height of the first tab and $H_R$ designates a height of the resin layer, the $H_T$ and the $H_R$ may satisfy $0.5 \leq H_R/H_T \leq 1$.

In the disclosure, the $H_T$ and the $H_R$ may satisfy $0.5 \leq H_R/H_T \leq 0.95$.

In the disclosure, when $W_T$ designates a width of the first tab and $W_R$ designates a width of the resin layer, the $W_T$ and the $W_R$ may satisfy $0.5 \leq W_R/W_T$.

In the disclosure, when $L_C$ designates a center line of the first tab in a width direction, the resin layer may be present so as to overlap the $L_C$.

In the disclosure, the resin layer may contain at least one of a thermoplastic resin and a curable resin.

In the disclosure, the resin layer may contain an elastomer resin.

Advantageous Effects of Disclosure

The battery in the present disclosure exhibits an effect of excellent bonding of the tabs and the current collecting terminals.

DESCRIPTION OF EMBODIMENTS

The battery in the present disclosure will be hereinafter explained in details with reference to drawings. Each drawing described as below is a schematic view, and the size and the shape of each portion are appropriately exaggerated in order to be understood easily. Furthermore, in the present description, upon expressing an embodiment of arranging one member with respect to the other member, when it is expressed simply "on" or "below", both of when the other member is directly arranged on or below the one member so as to contact with each other, and when the other member is arranged above or below the one member interposing an additional member, can be included unless otherwise described.

Figure 1:
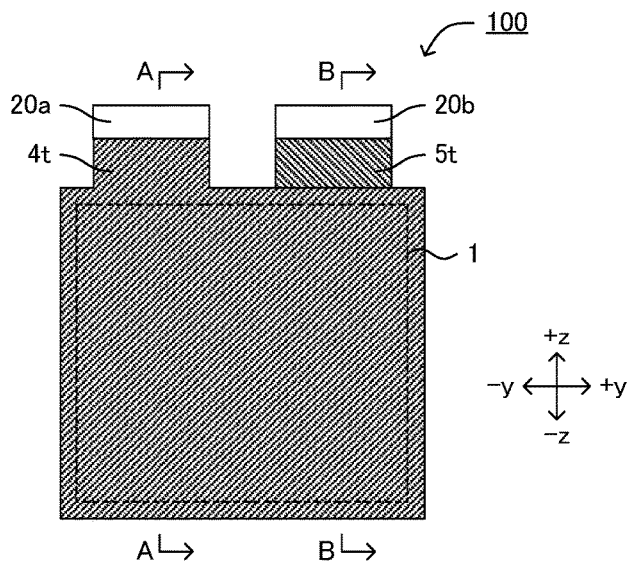
FIG. 1 is a schematic front view exemplifying the battery in the present disclosure.
Figure 2A:
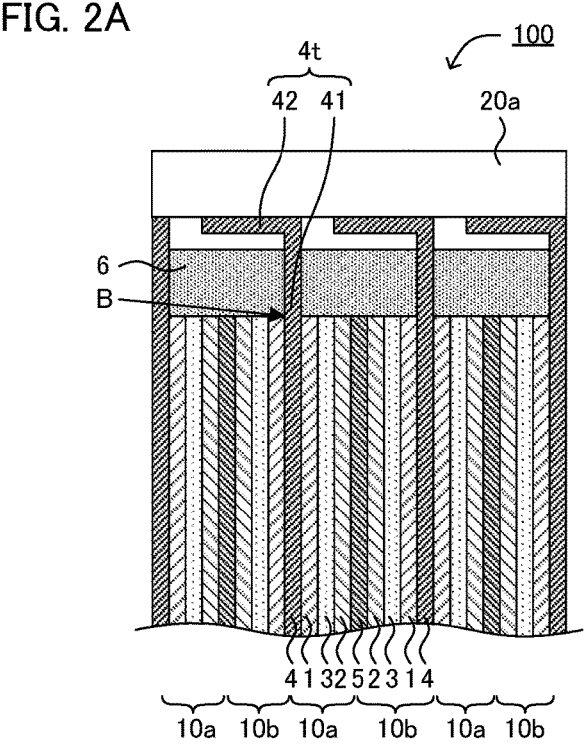
FIG. 2A is a cross-sectional view of A-A in FIG. 1.
Figure 2B:
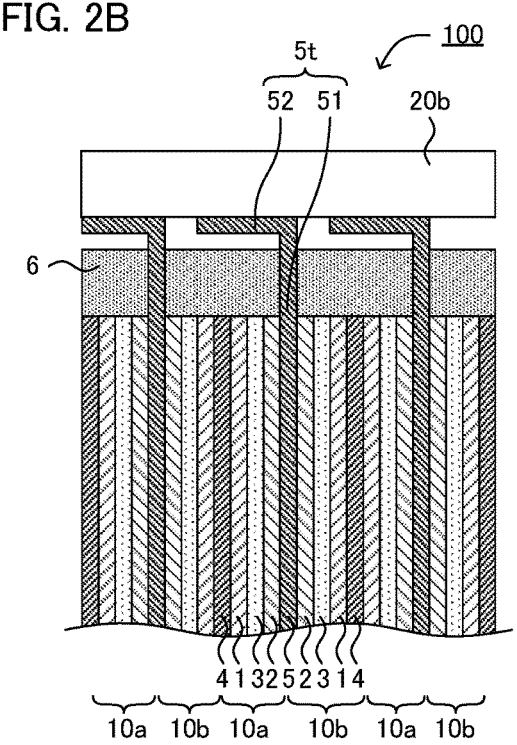
FIG. 2B is a cross-sectional view of B-B in FIG. 1.

FIG. 1 is a schematic front view exemplifying the battery in the present disclosure. FIG. 2A is a cross-sectional view of A-A in FIG. 1, and FIG. 2B is a cross-sectional view of B-B in FIG. 1. As shown in FIGS. 2A and 2B, battery 100 comprises a plurality of power generating element 10. The power generating element 10 includes first active material layer 1, second active material layer 2, electrolyte layer 3 arranged between the first active material layer 1 and the second active material layer 2, first current collector 4 that corrects currents of the first active material layer 1, and second current collector 5 that corrects currents of the second active material layer 2.

As shown in FIG. 2A, $D_T$ designates a thickness direction of the power generating element 10. In FIG. 2A, the thickness direction $D_T$ of the power generating element 10 corresponds to x axis direction. The first current collector 4 shown in FIG. 2A includes root part 41 that extends to a direction crossing the thickness direction $D_T$ of the power generating element 10, and a curved part 42 that is arranged in a tip of the root part 41 and extends to a direction crossing the direction the root part 41 extends. In FIG. 2A, the direction the root part 41 extends is z axis direction, and the direction the curved part 42 extends is x axis direction. Also, in the thickness direction $D_T$ of the power generating element 10, a plurality of the first tab 4t (particularly the root part 41) is arranged to overlap with each other.

As shown in FIG. 1 and FIG. 2A, the battery 100 includes first current collecting terminal 20a electronically connected to a plurality of first tab 4t. In FIG. 1 and FIG. 2A, the curved part 42 in the first tab 4t contacts the first current collecting terminal 20a in a surface. The curved part 42 and the first current collecting terminal 20a are bonded by, for example, laser welding. Also, resin layer 6 that reinforces the root part 41 is arranged between the first tab 4t neighboring.

According to the present disclosure, the resin layer that reinforces the root part of the tab is arranged, and thus the battery with excellent bonding of tabs and current collecting terminals may be achieved. As described above, the thickness of the tab is thin, and thus unintended deformation easily occurs. When the deformation of the tab occurs, there is a case where the bonding of the tab and the current collecting terminal is insufficient. In contrast, in the present disclosure, a resin layer that reinforces the root part of the tab is arranged. For this reason, occurrence of the unintended deformation may be inhibited, and the bonding of the tabs and the current collecting terminals may be well. As a result, effects such as reduction of internal resistance and improvement of cycle characteristics may be obtained. Also, by arranging the resin layer that reinforces the root part of the tab, the parts in the cathode side do not easily contact the parts in the anode side, and thus occurrence of internal short circuit may be inhibited. Also, by arranging the resin layer that reinforces the root part of the tab, slippage of the parts configuring the power generating element may be inhibited. Also, by arranging the resin layer that reinforces the root part of the tab, shifting of the positions of the parts configuring the power generating element may be inhibited.

1. Power Generating Element

The power generating element in the present disclosure includes a first active material layer, a second active material layer, an electrolyte layer arranged between the first active material layer and the second active material layer, a first current collector that collects currents of the first active material layer, and a second current collector that collects currents of the second active material layer. Also, for example, power generating element 10a and power generating element 10b shown in FIG. 2A share second current collector 5, and the both are connected in parallel.

In the present disclosure, when the first active material layer is a cathode active material layer, the first current collector is a cathode current collector, the second active material layer is an anode active material layer, and the second current collector is an anode current collector. In contrast, when the first active material layer is an anode active material layer, the first current collector is an anode current collector, the second active material layer is a cathode active material layer, and the second current collector is a cathode current collector.

(1) First Current Collector

The first current collector in the present disclosure is electronically connected to the first active material layer, and collects currents of the first active material layer. The first current collector is, for example, arranged in the surface of the first active material layer that is opposite to the electrolyte layer. Also, as shown in FIG. 1, the first current collector 4 includes first tab 4t. As shown in FIG. 2A, the first tab 4t is arranged in a region not overlapping the first active material layer 1 in the thickness direction $D_T$ of the power generating element 10. For example, when the first active material layer 1 is formed by a coating method, the first tab 4t is an uncoated part where the first active material layer is not formed.

As shown in FIG. 2A, the first tab 4t includes root part 41. The root part 41 is a part that extends from boarder B of the first active material layer 1 and the first current collector 4, toward outside. In FIG. 2A, the direction the root part 41 extends orthogonally intersects the thickness direction $D_T$ of the power generating element 10. The angle (acute angle side) formed by the direction the root part 41 extends and the thickness direction $D_T$ of the power generating element 10 is, for example, 60° or more and 90° or less, may be 75° or more and 90° or less, and may be 80° or more and 90° or less.

As shown in FIG. 2A, the first tab 4t may include curved part 42 that is arranged in a tip of the root part 41, and extends to a direction crossing a direction to which the root part 41 extends. When the curved part 42 in the first tab 4t contacts the first current collecting terminal 20a in a surface, the first tab 4t and the first current collecting terminal 20a may be more stably bonded. The curved part 42 is arranged in a tip of the root part 41. The tip of the root part 41 refers to an edge that is opposite side from the boarder B described above. Also, it is preferable that the curved part 42 and the root part 41 are the same part, and the both are continuously formed. In this case, the tip of the root part 41 corresponds to a curved point where the root part 41 crosses the curved part 42.

In FIG. 2A, the direction to which the curved part 42 extends is parallel to the thickness direction $D_T$ of the power generating element 10. The angle (acute angle side) formed by the direction the curved part 42 extends and the thickness direction $D_T$ of the power generating element 10 is, for example, 0° or more and 30° or less, may be 0° or more and 15° or less, and may be 0° or more and 10° or less. Also, the angle (acute angle side) formed by the direction the curved part 42 extends and the direction the root part 41 extends is, for example, 60° or more and 90° or less, may be 75° or more and 90° or less, and may be 80° or more and 90° or less.

Figure 3A:
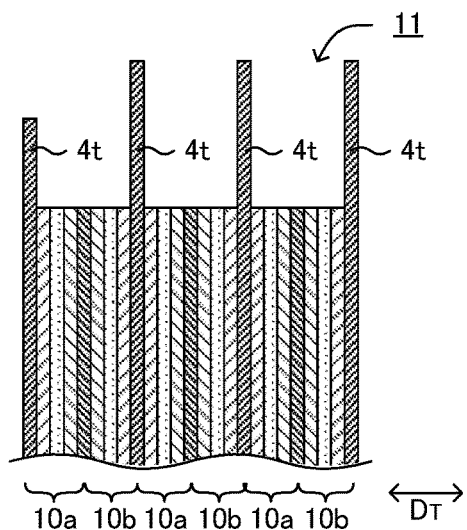
FIGS. 3A to 3C are schematic cross-sectional views exemplifying the method for forming the curved part in the present disclosure.
Figure 3B:
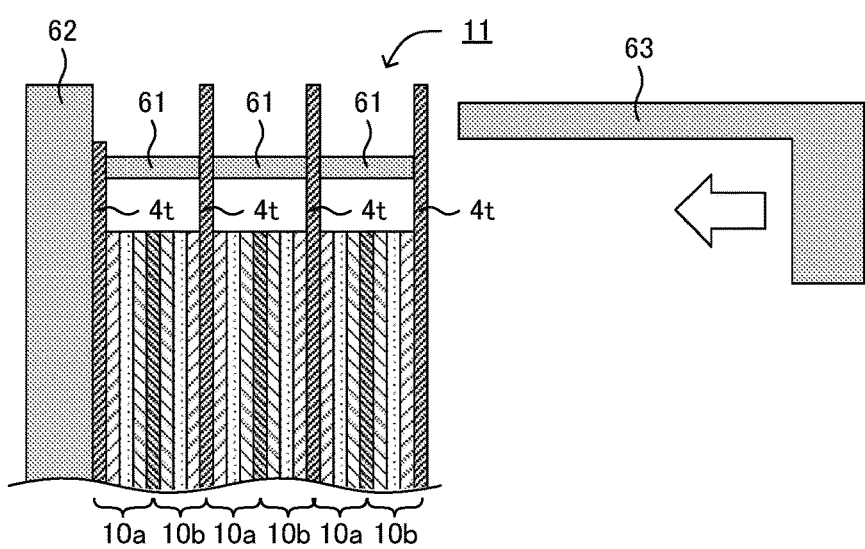
Figure 3C:
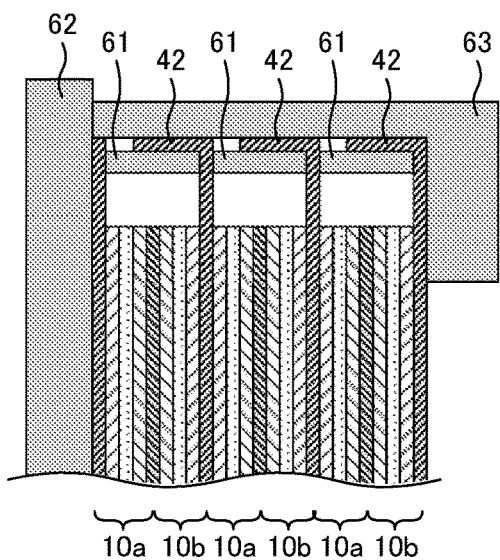

The first tab 4t including the curved part 42 is formed by, for example, the method as follows. That is, as shown in FIG. 3A, layered body 11, in which a plurality of a pair of the power generating element 10 (10a and 10b) are layered in the thickness direction $D_T$ of the power generating element 10, is prepared. The layered body 11 shown in FIG. 3A has a structure in which three of a pair of the power generating element 10 (10a and 10b) are layered. Also, each of the first tab 4t extends so as to orthogonally intersects the thickness direction $D_T$ of the power generating element 10. Next, as shown in FIG. 3B, comb shape part 61 is arranged between the first tab 4t neighboring. Further, fixing part 62 is arranged in one surface side of the layered body 11. In that state, the first tab 4t is drawn through bent part 63. In this manner, as shown in FIG. 3C, the curved part 42 is formed between the comb shape part 61 and the bent part 63.

Figure 4A:
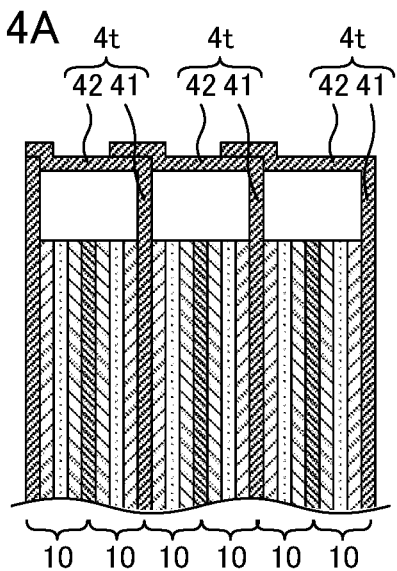
FIGS. 4A and 4B are schematic cross-sectional views exemplifying the power generating element in the present disclosure.
Figure 4B:
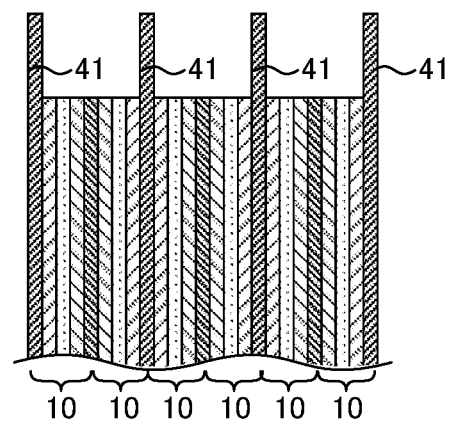

As shown in FIG. 4A, in the first tab 4t neighboring, the curved part 42 in one of the first tab 4t may contact the other first tab 4t. Also, as shown in FIG. 2A described above, in the first tab 4t neighboring, the curved part 42 in one of the first tab 4t may not contact the other first tab 4t. Also, as shown in FIG. 4B, the first tab 4t may include the root part 41, but not include the curved part 42.

As shown in FIG. 2A, a plurality of the first tab 4t is arranged to overlap with each other in the thickness direction $D_T$ of the power generating element 10. For example, in FIG. 1, a plurality of the first tab 4t is arranged so as to overlap with each other in front and back direction of the paper (x axis direction not illustrated). Also, in the thickness direction $D_T$ of the power generating element 10, a plurality of the first tab 4t may partially overlap with each other, and may entirely overlap with each other.

The first current collector in the present disclosure is a cathode current collector or an anode current collector. Examples of the material for the cathode current collector may include a metal such as aluminum, SUS, and nickel. Examples of the material for the anode current collector may include a metal such as copper, SUS, and nickel. Examples of the shape of the first current collector may include a foil shape and a mesh shape. The thickness of the first current collector is, for example, 30 μm or less, may be 15 μm or less, and may be 5 μm or less. Meanwhile, the thickness of the first current collector is, for example, 1 μm or more.

(2) Resin Layer

In the plurality of the power generating element, the resin layer in the present disclosure is a layer arranged between the first tab neighboring and reinforces the root part of the first tab. The resin layer contains one kind or two kinds or more of a resin. The resin may be a thermoplastic resin, and may be a curable resin (cured product) such as a thermosetting resin and an ultraviolet curing resin. When the resin layer contains at least one of the thermoplastic resin and the curable resin, there is an advantage that the root part of the first tab can be strongly reinforced. Also, the resin may be an elastomer resin. Examples of the elastomer resin may include a rubber and a thermoplastic elastomer. When the resin layer contains the elastomer resin, there is an advantage that the breakage of the first tab is inhibited even when the volume change of the power generating element occurs due to charge and discharge.

Examples of the resin may include a polyolefin resin (such as a polyethylene resin and a polypropylene resin), a polyurethane resin, a polyimide resin, a polyester resin, and a silicone resin. Examples of the rubber may include a silicone rubber, a fluorine rubber, an epichlorohydrin rubber, an acrylic rubber, an ethylene acrylic rubber, a urethane rubber, a nitrile rubber, a hydrogenated nitrile rubber, a chloroprene rubber, an EPDM (ethylene-propylene-diene rubber), an ethylene rubber, a propylene rubber, a butyl rubber, a butadiene rubber, a styrene butadiene rubber, a natural rubber, polyisobutylene, and an isoprene rubber. Examples of the thermoplastic elastomer may include an olefin-based thermoplastic elastomer, a styrene butadiene-based thermoplastic elastomer, a polybutadiene-based thermoplastic elastomer, and a styrene isoprene-based thermoplastic elastomer.

The proportion of the resin in the resin layer is, for example, 50 weight % or more, may be 70 weight % or more, and may be 90 weight % or more. Also, the resin layer may contain plus the resin. The Young's modulus of the resin layer is not particularly limited, but for example, it is $1*10^4$ MPa or less, may be $1*10^3$ MPa or less, may be $1*10^2$ MPa or less, and may be 10 MPa or less. When the Young's modulus of the resin layer is low, the resin layer is usually with excellent elasticity.

Figure 5:
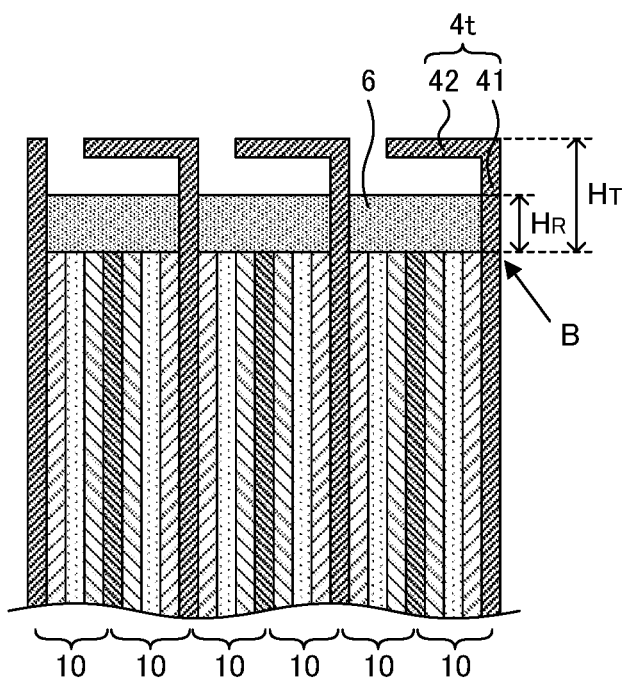
FIG. 5 is a schematic cross-sectional view exemplifying the power generating element in the present disclosure.
Figure 5:
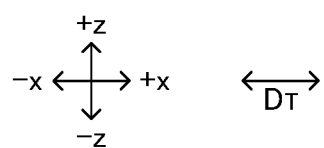

As shown in FIG. 5, $H_T$ designates the height of the first tab 4t, and $H_R$ designates the height of the resin layer 6. The $H_T$ and the $H_R$ refer to the maximum length in the direction (z axis direction) orthogonally intersects the thickness direction $D_T$ of the power generating element 10. Also, the reference point of the bottom side (down side of the drawing) of the $H_T$ and the $H_R$ is the position of the boarder B of the first active material layer 1 and the first current collector 4. The rate of the $H_R$ with respect to the $H_T$, which is $H_R/H_T$ is, for example, 0.1 or more, may be 0.3 or more, and may be 0.5 or more. If the $H_R/H_T$ is too small, there is a possibility that the root part of the first tab may not be sufficiently reinforced. Meanwhile, the $H_R/H_T$ is preferably 1 or less. If the $H_R/H_T$ exceeds 1, the resin layer may be present between the first tab and the first current collecting terminal. In that case, there is a possibility that the resistance increase may occur due to the resin layer. Also, the $H_R/H_T$ may be 0.95 or less, and may be 0.9 or less. Also, the difference between the $H_T$ and the HR, which is $H_T-H_R$ is, for example, 5 mm or less, may be 3 mm or less, and may be 1 mm or less.

Figure 6:
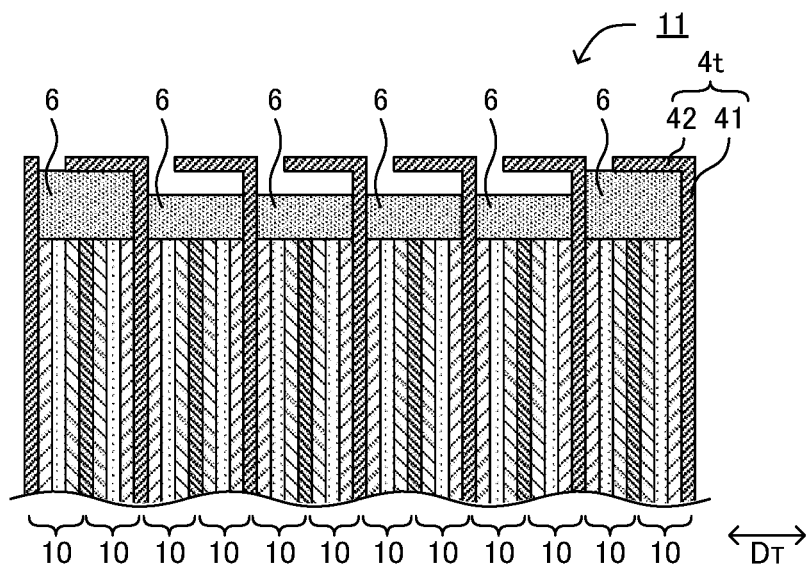
FIG. 6 is a schematic cross-sectional view exemplifying the power generating element in the present disclosure.

As shown in FIG. 6, in the thickness direction $D_T$ of the power generating element 10, the height of the resin layer 6 positioned in at least one end of the layered body 11 (assembly of a plurality of the power generating element 10) may be larger than the height of the resin layer 6 positioned in the center of the layered body 11. The center of the layered body 11 refers to a central point of a straight line connecting the both ends of the layered body 11. For example, when the volume change of the power generating element occurs due to charge and discharge, that stress tends to concentrate on the end of the layered body 11. For this reason, by increasing the height of the resin layer 6 positioned in the end of the layered body 11, the breakage of the first tab due to the volume change can be inhibited. $H_1$ designates the height of the resin layer 6 positioned in the end of the layered body 11, and $H_2$ designates the height of the resin layer 6 positioned in the center of the layered body 11. The rate of $H_1$ with respect to $H_2$, which is $H_1/H_2$ is, for example, 1.1 or more, may be 1.2 or more, and may be 1.5 or more. Meanwhile, the $H_1/H_2$ is, for example, 2.0 or less.

Figure 7:
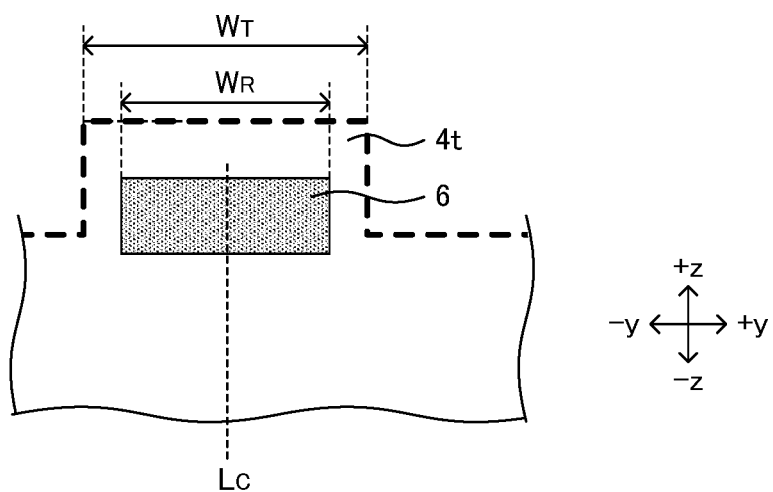
FIG. 7 is a schematic front view exemplifying the power generating element in the present disclosure.

As shown in FIG. 7, $W_T$ designates the width of the first tab 4t, and $W_R$ designates the width of the resin layer 6. The $W_T$ and the $W_R$ refer to the maximum length in the direction (y axis direction) orthogonally intersects the thickness direction of the power generating element. Also, the width $W_T$ of the first tab 4t is, strictly, the width of a protruding part of the first tab 4t, as shown in FIG. 7. When there is a protruding part, the width of the protruding part may be adopted as the width $W_T$ of the first tab 4t. The rate of $W_R$ with respect to $W_T$, which is $W_R/W_T$ is, for example, 0.1 or more, may be 0.3 or more, and may be 0.5 or more. If the $W_R/W_T$ is too small, there is a possibility that the root part of the first tab may not be sufficiently reinforced. Meanwhile, the $W_R/W_T$ may be 1 or less and may be larger than 1. In the latter case, the $W_R/W_T$ is, for example 1.5 or less. In the former case, the $W_R/W_T$ may be 0.95 or less, and may be 0.9 or less. Also, as shown in FIG. 7, $L_C$ designates a center line of the first tab 4t in the width direction (y axis direction). The center line $L_C$ is a line parallel to z axis direction, and strictly is a center line in the protruding part of the first tab 4t, as shown in FIG. 7. In the present disclosure, it is preferable that the resin layer 6 is present so as to overlap the $L_C$.

There are no particular limitations on the method for forming the resin layer, and examples thereof may include a method such that a small nozzle is arranged between the first tabs neighboring, and a resin is injected from that nozzle. Depending on the kind of the resin to be injected, for example, a curing treatment such as heating and UV irradiation may be performed.

(3) Second Current Collector

The second current collector in the present disclosure is electronically connected to the second active material layer, and collects currents of the second active material layer. The second current collector is, for example, arranged in the surface of the second active material layer that is opposite from the electrolyte layer. Also, as shown in FIG. 1, the second current collector 5 may include second tab 5t. As shown in FIG. 2B, the second tab 5t is arranged in a region not overlapping the second active material layer 2 in the thickness direction $D_T$ of the power generating element 10.

As shown in FIG. 2B, the second tab 5t may include root part 51. Similarly, the second tab 5t may include curved part 52 that is arranged in a tip of the root part 51 and extends to a direction crossing a direction the root part 51 extends. Similarly, a plurality of the second tab 5t may be arranged to overlap with each other in the thickness direction $D_T$ of the power generating element 10. Details of the second tab is in the same contents as those of the first tab described above; thus the descriptions herein are omitted.

As shown in FIG. 1, the second tab 5t and the first tab 4t may be arranged in a same side of the power generating element. Such a structure is called a single-tab structure. Meanwhile, although not illustrated in particular, the second tab 5t and the first tab 4t may be respectively arranged in the sides of the power generating element that faces to each other. Such a structure is called a double-tab structure.

(4) First Active Material Layer, Second Active Material Layer, and Electrolyte Layer The first active material layer in the present disclosure is a cathode active material layer or an anode active material layer. The second active material layer in the present disclosure has the polarity opposite to that of the first active material layer.

The cathode active material layer contains at least a cathode active material. The cathode active material layer may further contain at least one of a conductive material, an electrolyte and a binder. Examples of the cathode active material may include an oxide active material. Examples of the oxide active material may include a rock salt bed type active material such as $LiNi_{1/3}Co_{1/3}Mn_{1/3}O_2$; a spinel type active material such as $LiMn_2O_4$; and an olivine type active material such as $LiFePO_4$. Also, as the cathode active material, sulfur (S) may be used. Examples of the shape of the cathode active material may include a granular shape.

Examples of the conductive material may include a carbon material. The electrolyte may be a solid electrolyte and may be an electrolyte solution. The solid electrolyte may be an organic solid electrolyte such as a gel electrolyte, and may be an inorganic solid electrolyte such as an oxide solid electrolyte and a sulfide solid electrolyte. Also, the electrolyte solution (liquid electrolyte) contains, for example, a supporting electrolyte such as $LiPF_6$, and a solvent such as a carbonate-based solvent. Also, examples of the binder may include a rubber-based binder and a fluoride-based binder.

The anode active material layer contains at least an anode active material. The anode active material layer may further contain at least one of a conductive material, an electrolyte, and a binder. Examples of the anode active material may include a metal active material such as Li and Si, a carbon active material such as graphite, and an oxide active material such as $Li_4Ti_5O_{12}$. Examples of the shape of the anode active material may include a granular shape and a foil shape. The conductive material, the electrolyte, and the binder are in the same contents as those described above.

The electrolyte layer is arranged between the cathode active material layer and the anode active material layer, and contains at least an electrolyte. The electrolyte may be a solid electrolyte and may be an electrolyte solution. The electrolyte is in the same contents as those described above. The electrolyte layer may include a separator.

(5) Method for Forming Power Generating Element

Figure 8A:
FIGS. 8A to 8E are schematic cross-sectional views exemplifying the method for forming the power generating element in the present disclosure.
Figure 8B:
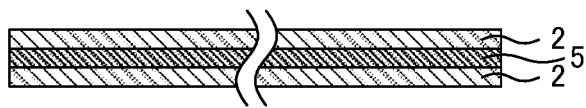

There are no particular limitations on the method for forming the power generating element in the present disclosure. FIGS. 8A to 8E are schematic cross-sectional views exemplifying the method for forming the power generating element in the present disclosure. FIGS. 8A to 8E correspond to the cross-sectional view of A-A in FIG. 1, in the same manner as FIG. 2A described above. First, as shown in FIG. 8A, second current collector 5 is prepared. Next, as shown in FIG. 8B, second active material layer 2 is respectively formed on both surfaces of the second current collector 5. Examples of the method for forming the second active material layer may include a method of pasting a slurry containing the material of the second active material layer on the second current collector, and drying thereof.

Figure 8C:
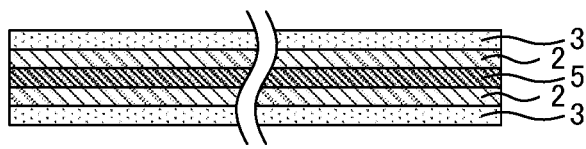
Figure 8D:
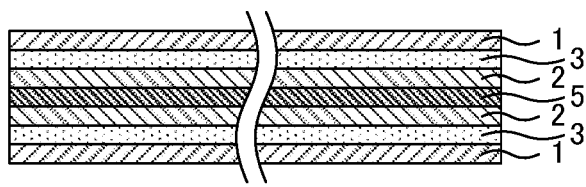
Figure 8E:
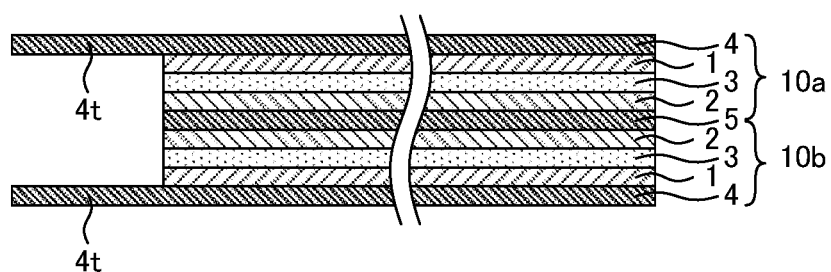

Next, as shown in FIG. 8C, electrolyte layer 3 is respectively formed on two of the second active material layer 2. Examples of the method for forming the electrolyte layer may include a transferring method. In the transferring method, for example, an electrolyte layer is placed on a base material to form a part, and the electrolyte layer in that part is arranged so as to face the second active material layer, and pressed, then the base material is peeled off to transfer the electrolyte layer on the second active material layer. Next, as shown in FIG. 8D, first active material layer 1 is respectively formed on two of the electrolyte layer 3. Examples of the method for forming the first active material layer may include a transferring method. The transferring method is as described above. Next, as shown in FIG. 8E, first current corrector 4 including first tab 4t is respectively arranged on two of the first active material layer 1. Thereby, a pair of power generating element 10 (10a and 10b) sharing the second current collector 5 is obtained.

Incidentally, although not illustrated in particular, in a pair of the power generating element 10 (10a and 10b), one of the power generating element 10a may include the first current collector 4, but the other power generating element 10b may not include the first current collector 4. For example, as shown in FIG. 3A, when a plurality of a pair of the power generating element 10 (10a and 10b) is layered in the thickness direction $D_T$ of the power generating element 10, improvement of volume energy density may be achieved by not continuously arranging two of the first current collector 4.

2. Battery

The battery in the present disclosure includes a first current collecting terminal electronically connected to the plurality of the first tab. Also, the battery in the present disclosure may include a second current collecting terminal electronically connected to the plurality of a second tab. Also, the first tab and the second tab are generally referred to as tabs, and the first current collecting terminal and the second current collecting terminal are generally referred to as current collecting terminals. There are no particular limitations on the material of the current collecting terminals, and examples thereof may include a metal such as SUS. The tabs and the current collecting terminals are bonded. Examples of the method for bonding the tabs and the current collecting terminals may include a method in which welding such as a laser welding and an electron beam welding, is used, a method in which a conductive paste is used, and a method in which a solder is used.

The battery in the present disclosure may include an outer package for storing the plurality of the power generating element. Examples of the outer package may include a case type outer package and a laminate type outer package. Also, the kind of the battery in the present disclosure is not particularly limited, but is typically a lithium ion secondary battery. Further, the application of the battery in the present disclosure is not particularly limited, and examples thereof may include a power source for vehicles such as hybrid electric vehicles (HEV), plug-in hybrid electric vehicles (PHEV), battery electric vehicles (BEV), gasoline-fueled automobiles and diesel powered automobiles. In particular, it is preferably used as a power source for driving hybrid electric vehicles, plug-in hybrid electric vehicles, or battery electric vehicles. Also, the battery in the present disclosure may be used as a power source for moving bodies other than vehicles (such as rail road transportation, vessel and airplane), and may be used as a power source for electronic products such as information processing equipment.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SIGNS LIST 1 first active material layer
2 second active material layer
3 electrolyte layer
4 first current collector
4t first tab
5 second current collector
5t second tab
6 resin layer
10 power generating element
20a first current collecting terminal
20b second current collecting terminal
100 battery

What is claimed is:

1. A battery comprising a plurality of a power generating element, wherein:
   the power generating element includes a first active material layer, a second active material layer, an electrolyte layer arranged between the first active material layer and the second active material layer, a first current collector that collects currents of the first active material layer, and a second current collector that collects currents of the second active material layer;
   the first current collector includes a first tab including at least a root part;
   a plurality of the first tab is arranged to overlap with each other in a thickness direction of the power generating element;
   the battery includes a first current collecting terminal electronically connected to the plurality of the first tab; and
   in the plurality of the power generating element, a resin layer that reinforces the root part is arranged between the first tab neighboring.

2. The battery according to claim 1, wherein the first tab includes a curved part that is arranged in a tip of the root part, and extends to a direction crossing a direction to which the root part extends.

3. The battery according to claim 2, wherein an angle formed by the direction to which the curved part extends and the thickness direction of the power generating element is 0° or more and 30° or less.

4. The battery according to claim 1, wherein, when $H_T$ designates a height of the first tab and $H_R$ designates a height of the resin layer, the $H_T$ and the $H_R$ satisfy $0.5 \leq H_R/H_T \leq 1$.

5. The battery according to claim 4, wherein the $H_T$ and the $H_R$ satisfy $0.5 \leq H_R/H_T \leq 0.95$.

6. The battery according to claim 1, wherein, when $W_T$ designates a width of the first tab and $W_R$ designates a width of the resin layer, the $W_T$ and the $W_R$ satisfy $0.5 \leq W_R/W_T$.

7. The battery according to claim 1, wherein, when $L_C$ designates a center line of the first tab in a width direction, the resin layer is present so as to overlap the $L_C$.

8. The battery according to claim 1, wherein the resin layer contains at least one of a thermoplastic resin and a curable resin.

9. The battery according to claim 1, wherein the resin layer contains an elastomer resin.

* * * * *